(12) United States Patent
Muser

(10) Patent No.: US 6,755,432 B2
(45) Date of Patent: Jun. 29, 2004

(54) SUSPENSION SYSTEM FOR BICYCLE

(76) Inventor: Paul Muser, 230 Lakewood Drive, Oakville, Ontario (CA), L6K 1B2

( * ) Notice: Subject to any disclaimer, the term of this patent is extended or adjusted under 35 U.S.C. 154(b) by 0 days.

(21) Appl. No.: 10/352,234

(22) Filed: Jan. 28, 2003

(65) Prior Publication Data
US 2003/0146596 A1 Aug. 7, 2003

Related U.S. Application Data

(63) Continuation-in-part of application No. 09/761,182, filed on Jan. 18, 2001, now abandoned, which is a continuation-in-part of application No. PCT/CA99/00768, filed on Aug. 18, 1999, which is a continuation-in-part of application No. 09/135,059, filed on Aug. 18, 1998, now abandoned.

(51) Int. Cl.[7] .......................... B62K 25/00; B62K 19/00
(52) U.S. Cl. ..................................................... 280/283
(58) Field of Search ................................ 280/283–286, 280/275; 74/574, 551.2

(56) References Cited

U.S. PATENT DOCUMENTS

| 2,283,671 A | 5/1942 | Finlay et al. |
| 2,596,411 A | 5/1952 | Jordan |
| 2,824,734 A | 2/1958 | Linn et al. |
| 3,133,769 A | 5/1964 | Drake |
| 3,545,737 A | 12/1970 | Lamprey et al. |
| 3,675,787 A | 7/1972 | Krauskopf |
| 3,877,539 A | 4/1975 | Tilkens |
| 4,464,146 A | 8/1984 | Arthur |
| 4,913,255 A | 4/1990 | Takayanagi et al. |
| 5,217,241 A | 6/1993 | Girvin |
| 5,269,552 A | 12/1993 | Yelverton |
| 5,370,411 A | 12/1994 | Takamiya et al. |
| 5,427,208 A | 6/1995 | Motobu et al. |
| 5,487,443 A | 1/1996 | Thurm |
| 5,743,547 A | 4/1998 | Voss |
| 5,921,625 A | 7/1999 | Muser |
| 5,975,550 A | 11/1999 | Schonfeld |
| 5,984,057 A | 11/1999 | Nash |
| 6,406,048 B1 | 6/2002 | Castellano |
| 2001/0011806 A1 * | 8/2001 | Muser ........................ 280/283 |

FOREIGN PATENT DOCUMENTS

| DE | 886416 | 7/1949 |
| GB | 293941 | 7/1928 |
| JP | A-08175455 | 9/1996 |
| WO | WO 82/03361 | 10/1992 |
| WO | WO 98/39203 | 9/1998 |

* cited by examiner

Primary Examiner—Lesley D. Morris
Assistant Examiner—Matt Luby
(74) Attorney, Agent, or Firm—Ingrid E. Schmidt

(57) ABSTRACT

Suspension system for a bicycle has a damper assembly coupled to a first portion of the bicycle relatively movable to a second portion of the bicycle and includes a hydraulic damper made of polyurethane material. The damper assembly has an outer casing from which extends an arm for applying a torque to the damper. The arm may be segmented or include a series of apertures for coupling to the second portion of the cycle so that the effective length of the arm and the torque applied to the damper can be adjusted to suit the rider's requirements. A link couples the arm to the second portion of the bicycle and the link maybe adjustable in length so that the bicycle geometry can be adjusted.

22 Claims, 9 Drawing Sheets

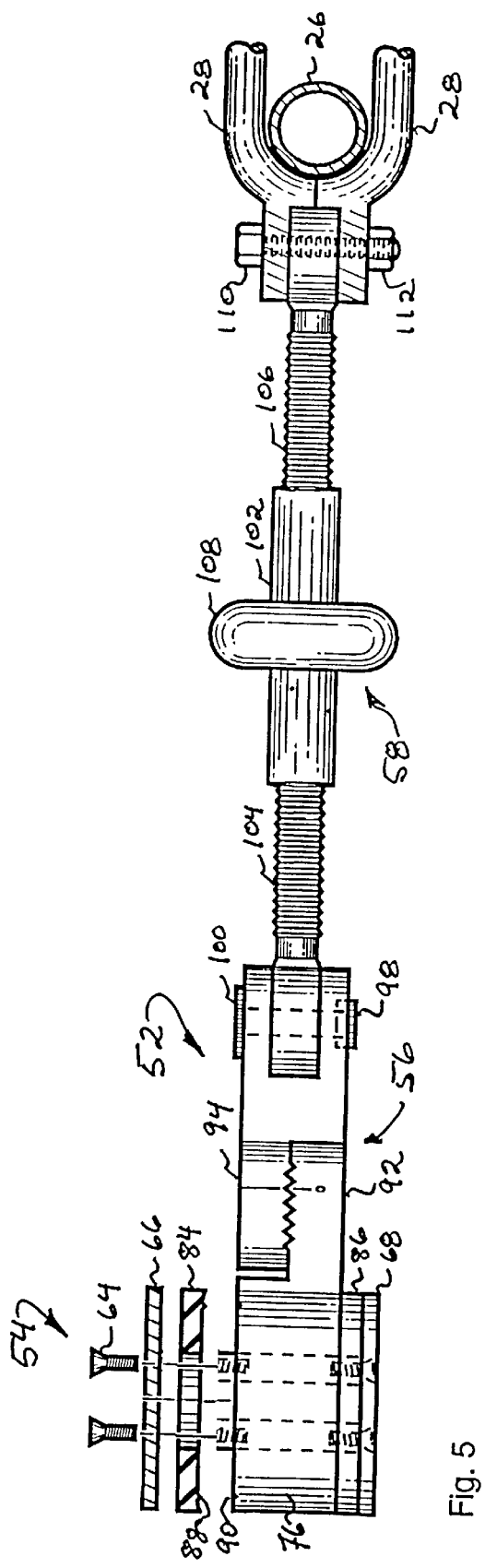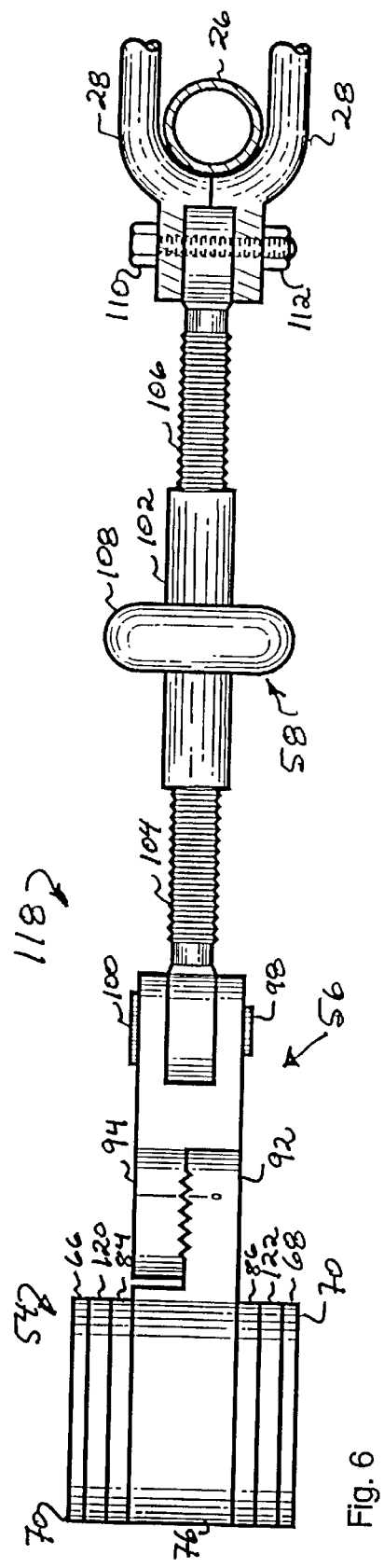
Fig. 5
Fig. 6

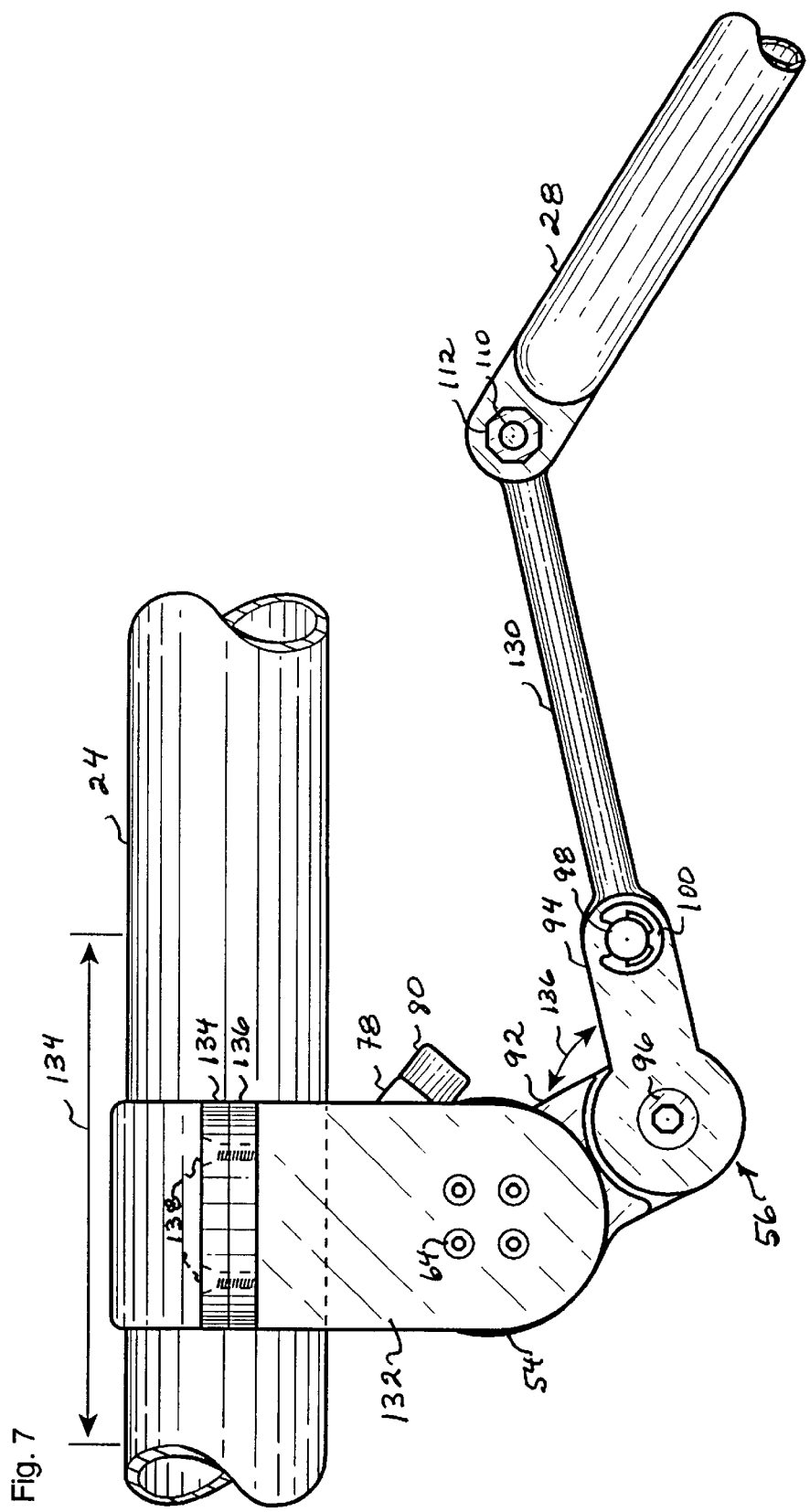

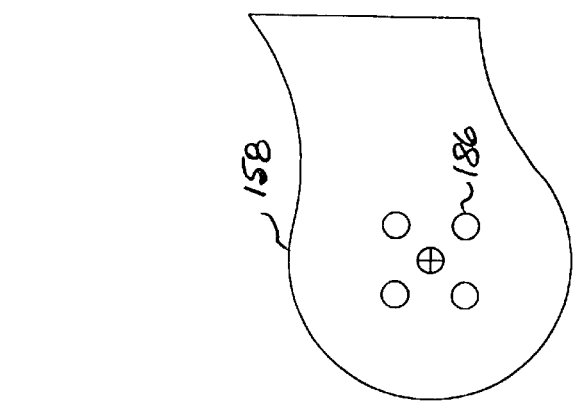
Fig. 13
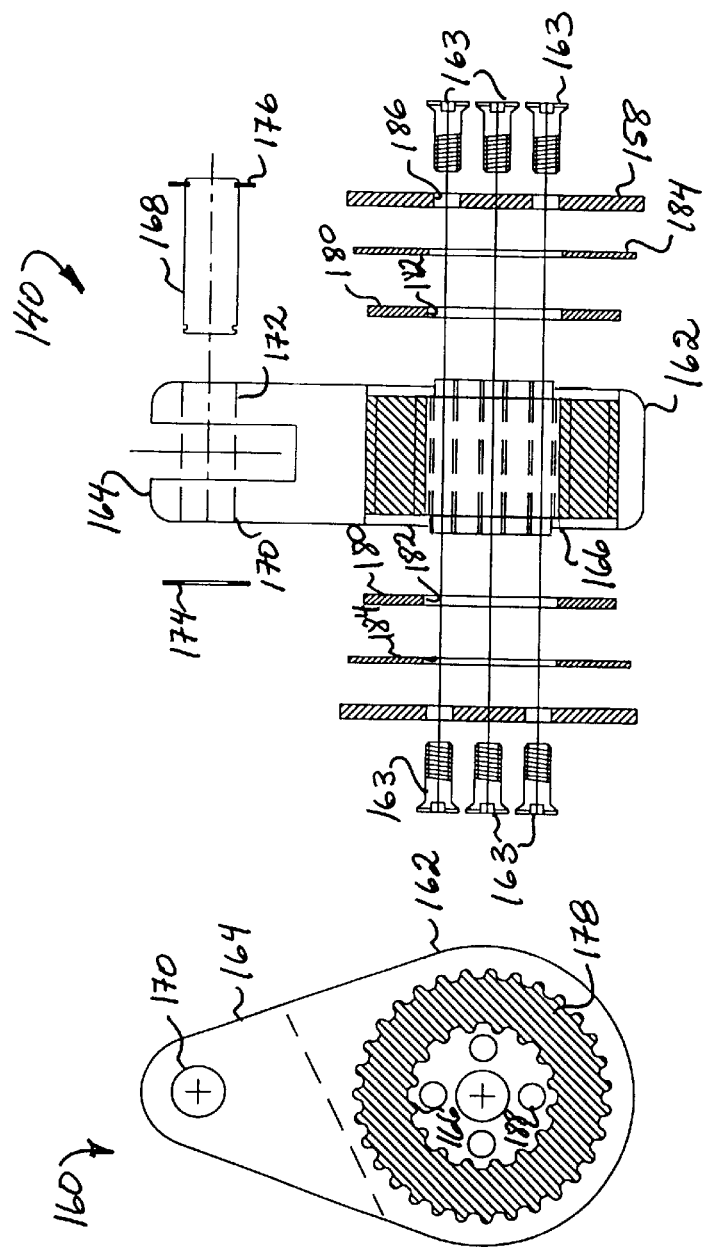
Fig. 12
Fig. 11

SUSPENSION SYSTEM FOR BICYCLE

This application is a continuation-in-part of U.S. application Ser. No. 09/761,182, now abandoned, filed on Jan. 18, 2001 which is a continuation-in-part of international application number PCTCA99/00768 filed on Aug. 18, 1999 and a continuation-in-part of U.S. application Ser. No. 09/135,059 filed on Aug. 18, 1998 now abandoned.

FIELD OF THE INVENTION

The invention relates to a suspension system for a bicycle and is intended for incorporation into the frame of the bicycle to improve comfort, safety and performance. As will be apparent from the description which follows, the suspension system will find application in other wheeled structures, such as motorized cycles, wheelchairs, and wherever suspension is needed.

BACKGROUND OF THE INVENTION

In order to incorporate a suspension system into a bicycle, the bicycle frame must have two relatively movable frame components. Normally, a first component is associated with a front wheel or forward portion of the cycle and a second component is associated with a rear wheel or rearward portion of the cycle. The suspension system is installed between the frame components and includes a shock absorber, whereby impacts to the frame are absorbed or directed in some way to minimize impacts to the rider.

A common form of shock absorption in a bicycle comprises a coiled compression spring mounted to a shaft coupling the components of the frame and bearing against a piston. The nature of the spring can be selected to provide lesser or greater resistance to impacts and the piston may optionally be associated with a hydraulic or pneumatic device, or an actuator to prestress the spring or modify the spring rate of travel. There is however a very limited range of travel for the spring and little flexibility for adjusting the sensitivity of the assembly in accordance with the weight of the rider and the nature of the terrain over which the rider anticipates riding the bicycle.

The disadvantages of a shock absorber incorporating a coiled compression spring with limited axial displacement as described above have been recognized in the motorcycle industry. U.S. Pat. No. 2,596,411 to Jordan provides a suspension system in which a torsion bar couples the front steering forks of a motorcycle and includes a shaft mounted to arms extending from the front wheel axis. A rubber-like member is secured to the shaft and is adapted to isolate the steering forks from the front wheel. A hydraulic, adjustable link couples one end of the arms remote from the torsion bar to the steering fork to supplement the resiliency in the torsion bar.

Similarly, in U.S. Pat. No. 5,487,443 to Therm, a torsion bar extends between frame struts on the mainframe. The torsion bar is fixed to the main frame at one end and is rotatably connected to the main frame at the other end on a "floating nut" or bushing. A torsion bar arm and turnbuckle link couple the torsion bar to a rear frame or swing arm for mounting a rear wheel. Preferably, an auxiliary damper to absorb linear shock is disposed between the mainframe and the rear frame.

Such torsion bars cannot be readily accommodated into a bicycle frame without substantial modification to the frame. Further, they exhibit limited sensitivity and cannot be adjusted to suit a rider's requirements and individual preferences for a firm suspension or a softer suspension.

U.S. Pat. No. 4,913,255 to Takayanagi et al provides a shock absorber for a motorcycle incorporating a rotary-type hydraulic damper and a turnbuckle linking an arm coupled to the shaft of the hydraulic damper and to a swing arm or rear frame for supporting a rear wheel.

The patent provides for varying the speed of rotation of the rotary-type oil bath hydraulic damper by changing the length of the turnbuckle link and thereby adjusting the damping power characteristic of the damper. However, the rotary oil bath hydraulic damper is costly and complex to produce. The suspension system is also undesirably cumbersome and adds significant weight to the cycle.

Applicant's invention is intended to overcome the aforementioned disadvantages in a simple and effective manner.

SUMMARY OF THE INVENTION

In its simplest embodiment, the invention provides a hydraulic damper comprising a cylinder of polyurethane material mounted to a toothed shaft which is adapted to be fixed to a first portion of a cycle frame. The polyurethane damper is confined by a casing bearing on an outer cylindrical surface of the damper, and by transverse bearings bearing on opposite ends of the damper and adapted to prevent axial displacement and flow of the damper. Advantage is being taken of the unique properties of polyurethane when placed under hydrostatic pressure.

Preferably, the casing has an arm extending in a radial direction to the axis of the shaft and the arm may be segmented into two portions, whereby the effective length of the arm can be adjusted. Advantageously, the resulting torque applied to the damper for a predetermined force can be varied to change the damping characteristics of the damper.

A link which couples the arm to a second portion of the cycle frame may be adjustable in length so as to maintain the cycle geometry, if desired, in any selected configuration of the arm portions. Alternatively, a bracket for supporting the shaft and slidable on the cycle frame is provided to compensate for changes in cycle geometry.

BRIEF DESCRIPTION OF THE DRAWINGS

A preferred embodiment of the invention and variations thereof are described below, with reference to the accompanying drawings, in which:

FIG. 5 is a top plan view of the components shown in FIG. 4 drawn in association with a mounting bracket and with a turnbuckle link fully extended;

FIG. 6 is a similar view to FIG. 5 showing an alternative embodiment of a damper assembly at one end of the suspension system;

FIG. 7 is a side elevational view of a third embodiment of the invention having a fixed length link;

FIG. 11 is a partly sectioned side elevation view of the damper assembly of FIG. 10;

FIG. 12 (drawn adjacent FIG. 11) is an assembly drawing showing the damper assembly of FIG. 11;

FIG. 13 (drawn adjacent FIG. 12) is a side view of a mounting bracket forming part of the suspension system of FIG. 10.

DESCRIPTION OF PREFERRED EMBODIMENT WITH REFERENCE TO DRAWINGS

Figure 1:
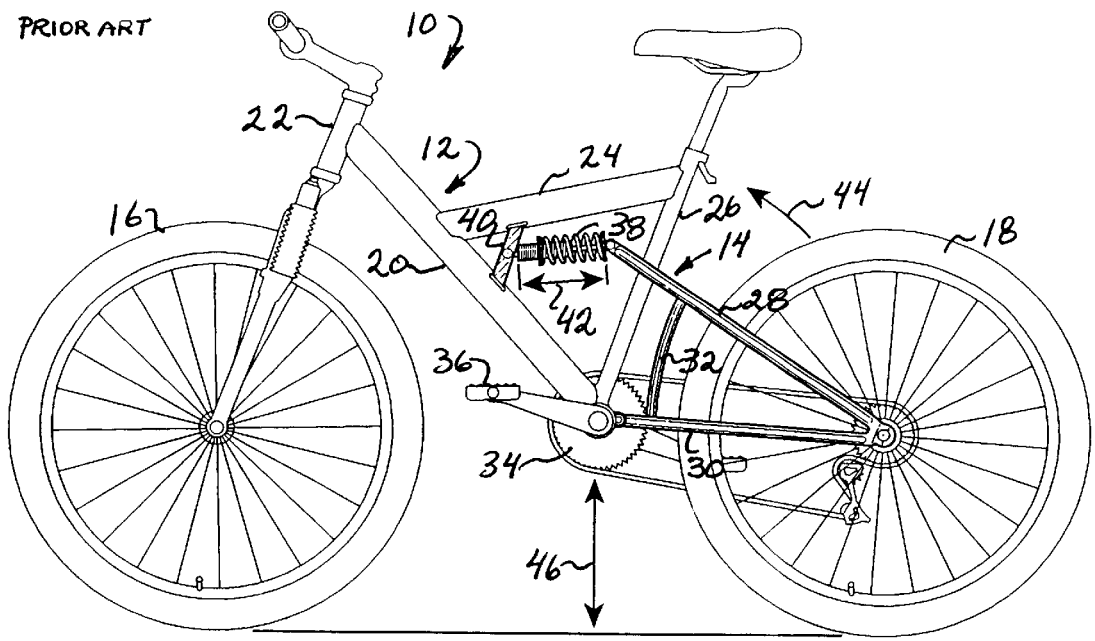
FIG. 1 is a side elevation view of a bicycle incorporating a prior art suspension system incorporated into a first style of bicycle frame.

A typical bicycle frame for a suspension bicycle is indicated by reference numeral 10 in the prior art drawing of FIG. 1. The frame 10 comprises a forward portion 12 independently movable from a rear portion 14 respectively supporting a front wheel 16 and a rear wheel 18.

The forward portion 12 of the bicycle frame 10 comprises a mainframe 20 to which is attached the head tube 22 at the front, a rearwardly extending cross-bar 24, and an upwardly-extending seat tube 26. The rear portion 14 of the bicycle frame 10 comprises a pair of upwardly extending seat stays 28 (only one of which may be seen in FIG. 1), a pair of rearwardly extending chain stays 30 pivotally connected to the bottom of the seat tube 26 and the mainframe 20, and a pair of generally vertically-extending stabilizers 32 connecting seat stays 28 to chain stays 30. A chain sprocket 34 is mounted in conventional fashion so as to be driven by pedals 36, at the junction between the seat tube 26 and mainframe 20.

In the prior art suspension device illustrated, a coiled compression spring 38 is mounted to a shaft extending between a forward end of the seat stays 28 and a bracket 40 which joins the cross-bar 24 to the mainframe 20. In the embodiment illustrated, the compression spring 38 has been prestressed and only occupies a portion of the length of the shaft. The maximum displacement of the compression spring 38 is indicated by arrow 42 and is commensurate with the length of the shaft.

In use, upward displacement of the rear wheel 18 as indicated by arrow 44 will manifest itself as a forward displacement of the coil spring 38 and a corresponding change in the ground clearance of the chain sprocket 34 as indicated by arrow 46.

Figure 2:
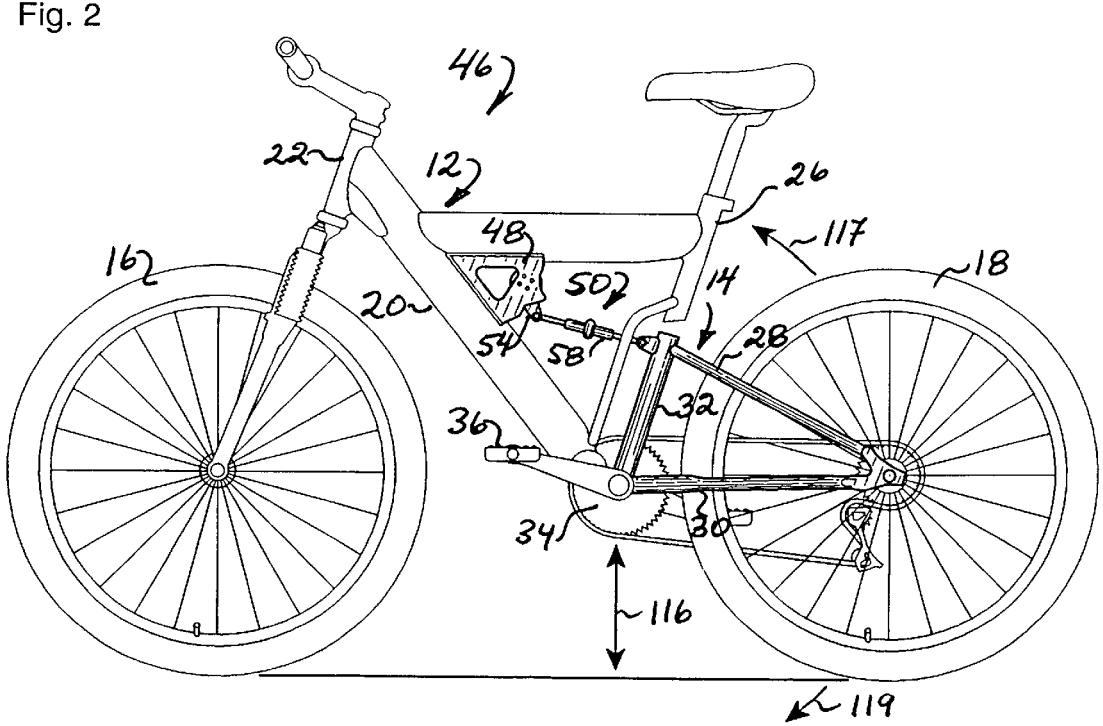
FIG. 2 is a similar view to FIG. 1 showing a suspension system in accordance with a first embodiment of the invention and incorporated into a second style of bicycle frame.

An alternative embodiment of a bicycle frame 46 is drawn in FIG. 2 and similar components are identified by like numerals. It will be seen that, in this style of bicycle frame, the seat tube 26 has its lower portion truncated so as to accommodate the rear portion 14 directly beneath the seat tube 26 and to allow for displacement of the rear portion 14 of the bicycle frame without obstruction by the seat tube 26. An alternative trigonal form of bracket 48 is welded to the cross-bar 24 and mainframe 20 for supporting one end of a suspension system 50. The suspension system 50 is made in accordance with one embodiment of this invention which will be described in more detail further below.

Figure 3:
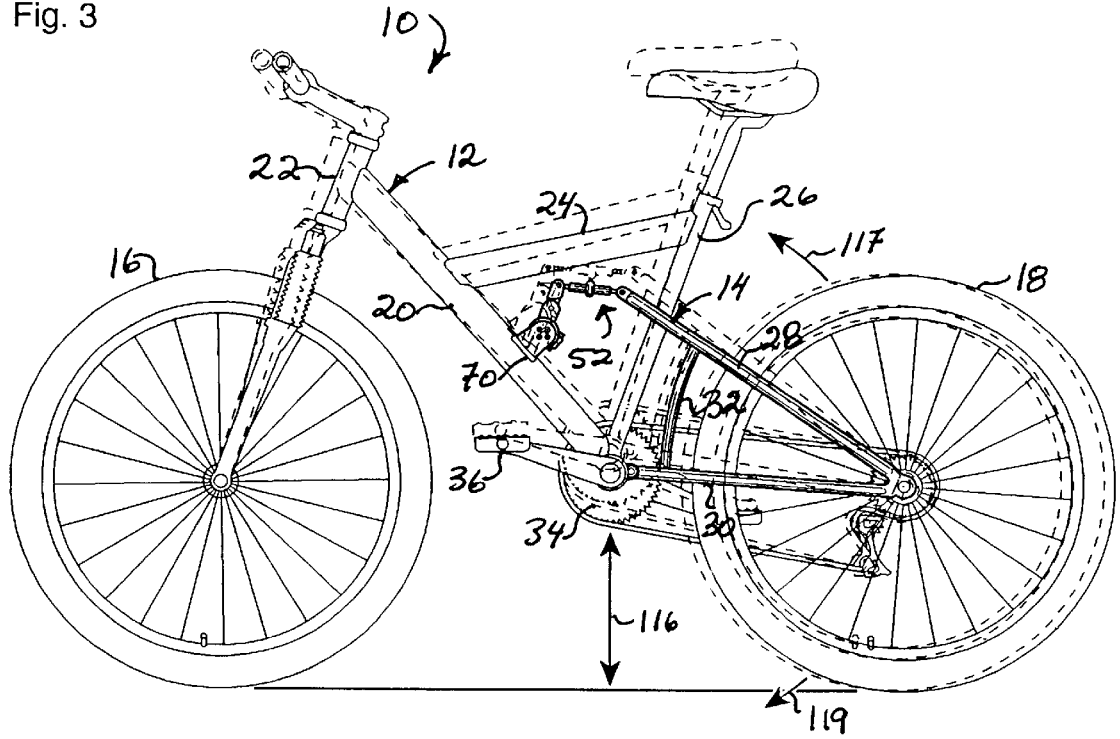
FIG. 3 is a similar view to FIG. 1 showing a second embodiment of the invention incorporated into a bicycle frame of the style shown in FIG. 1.

A preferred embodiment of a suspension system made in accordance with the invention is generally indicated by numeral 52 in FIG. 3 where it is incorporated into a bicycle frame 10 of the kind drawn in FIG. 1. The suspension system 52 is drawn to a larger scale in FIGS. 4 and 5, to which reference will now be made to describe the component parts. From left to right (as drawn), the components comprise a damper assembly 54, a segmented arm 56, and a turnbuckle link 58.

The damper assembly 54 comprises a central, hollow shaft 60 which extends across the width of the bicycle frame 10 and has threaded apertures 62 adapted to receive fasteners 64 (FIG. 5) which secure the shaft 60 to respective sides 66, 68 of a bifurcated bracket 70. The location of the bracket 70 may be seen in FIG. 3 where it is shown welded to the mainframe 20 and extending upwardly towards the cross-bar 24. It will be understood that the nature of the bracket 70 can be varied as exemplified by bracket 40 (FIG. 1) and bracket 48 (FIG. 2). For simplicity of illustration, the bracket 70 and fasteners 64 have been omitted from FIG. 4.

Figure 9:
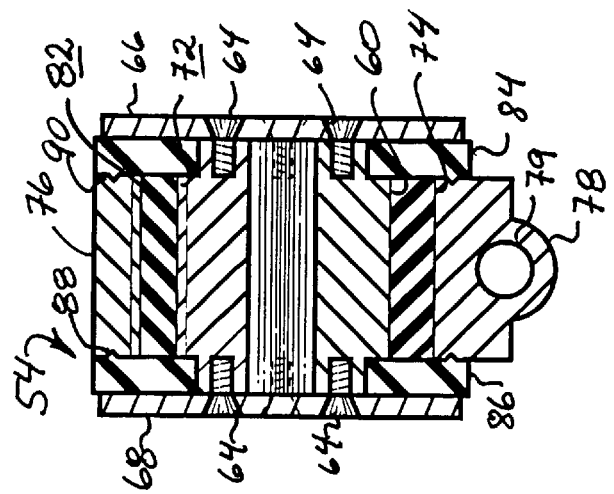
FIG. 9 is a cross-sectional view through the damper assembly drawn on line 9—9 of FIG. 8.

The outer ends of the shaft 60 comprise a reduced diameter portion, as can be seen more clearly from the cross-sectional view drawn in FIG. 9. The larger diameter portion of the shaft 60 has a toothed exterior surface indicated by numeral 72. The profile of the surface 72 is carefully formed to avoid sharp wells which might cut or tear a hydraulic damper 74 of polyurethane material positioned on the exterior of the shaft 60.

The hydraulic damper 74 is in the form of a hollow cylinder having a longitudinally-extending opening which receives the shaft 60 therein and is confined between the shaft 60 and an outer casing 76. The casing 76 has a split 77 and is formed with a pair of radially-extending lugs 78 disposed adjacent said split 77. Apertures 79 (FIG. 9) are formed in the lugs 78 for receiving a bolt 80 whereby the lugs are urged together so as to clamp the outer casing 76 into engagement with the outer cylindrical surface of the polyurethane hydraulic damper 74. The inner surface 82 of the casing 76 is also toothed and, together with the toothed surface 72 of the shaft 60, is adapted to mold the polyurethane material in situ, and form an intermediate gear between the casing and the shaft. It will be noted that the interior surface of the casing 76 adjacent to the lugs 78 is smooth so that the polyurethane material will not extrude into the split 77 and between the lugs 78 and also to prevent the polyurethane material from being pinched between the lugs.

The polyurethane material comprising the hydraulic damper 74 is further confined by a pair of bearings 84, 86 transversely-disposed to the axis of the shaft 60 and bearing on opposite ends of the hydraulic damper 74, the bearings 84, 86 being adapted to prevent axial displacement and flow of the polyurethane material out of the damper assembly 54. As can be seen most clearly in FIG. 9, the bearings 84, 86 each comprise an annular disc with a central aperture which receives the reduced diameter portion of the shaft 60 and locates against a shoulder formed between the reduced diameter portion and the toothed large diameter portion of the shaft 60. An annular lip 88 is formed on an inner surface of the bearings 84, 86 and locates in a cooperating groove 90 formed in the outer casing 76 so as to seal the assembly and prevent the introduction of dirt and the like into the interior of the assembly. The bearings 84, 86 also provide structural rigidity to the damper assembly 54 and locate the casing 76 so that it will not twist on the hydraulic damper 74. A preferred material of construction for the bearings is Delrin AF™ plastic of hardness R115 on the Rockwell scale or Addiprene™ 750 D at 75 D Shore hardness plastic and the polyurethane preferably is Addiprene™ L-100 or Vibrathane™ B60 2 having a durometer of between 80 A to 90 A on the Shore scale.

The outer casing 76 has a radially-extending arm 56 which is angularly-staggered from the lugs 78. The arm 56 is segmented into a first arm portion 92 integrally formed with the casing 76 (FIG. 5) and a second arm portion 94 rotatably coupled to the first arm portion 92 on a releasable fastener 96. It will be seen that the mating surfaces of the first arm portion 92 and the second arm portion 94 are serrated for positive engagement with one another in a range of angular positions. A change in angular position is indicated by the chain-dotted outline in FIG. 4 and the range of positions may extend between chain line 97 and chain line 99.

The outer, free end of the second arm portion 94 is bifurcated to receive therebetween one end of the turnbuckle link 58. A pivot pin 98 which traverses the bifurcated end of the second arm portion 94 and the turnbuckle link 58 is held in position with a Circlip™ 100 (see FIG. 5). The turnbuckle link 58 and the segmented arm 56 are thus pivotally linked.

The turnbuckle link 58 is adjustable in length and comprises an outer sleeve 102 and threaded rods 104, 106 which mesh with internal threads of the sleeve 102 at opposite ends thereof. Rotating the sleeve 102 using a friction grip 108 comprising an annular disc of polyurethane material varies the length of the link 58. It will be understood that means other than the grip 108 may be provided for rotating the sleeve 102. The threaded rod 106 remote from the damper assembly 54 is pivotally connected to the seat stays 28 forming part of the rear portion 14 of the bicycle frame 10 by means of a bolt 110 having a threaded outer end and a cooperating nut 112.

The dynamic operation of the suspension system in accordance with the invention will now be described with reference being made particularly to FIG. 8. Any shocks transmitted to the cycle, for example, as a result of the rear wheel 18 encountering an obstacle, will manifest itself as a forward displacement of the turnbuckle link 58 as indicated by arrow 114 to assume the position drawn in ghost outline in FIG. 8. The axial movement indicated by arrow 114 is quite substantial for purposes of illustration but it will be understood that, in practice, angular displacements of the outer casing 76 and of the segmented arm 56, of 15–60° are expected. Depending on wall thickness, the polyurethane material comprising the hydraulic damper 74 inside the damper assembly 54 can be displaced through a 90° arc before reaching the limit of its tensile strength (about 8,000 p.s.i.). In practice, the maximum stress applied to the polyurethane material will be approximately 600 p.s.i.

It will be noted that a small angular displacement of the polyurethane material is associated with a significantly large travel distance at the outer end of the segmented arm 56. This is an important advantage for off-road cycling where it is necessary for the wheel movement indicated by arrow 117 in FIG. 3 to vary constantly and sometimes greatly, to accommodate uneven surfaces and to allow the cycle to track properly.

Figure 8:
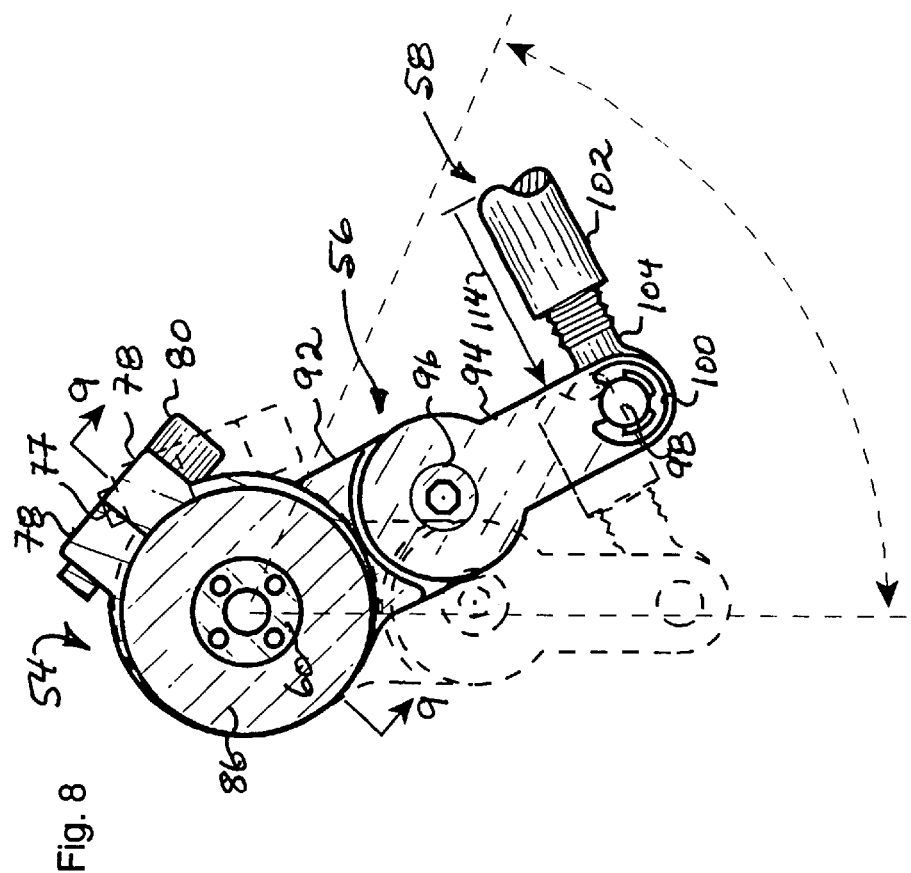
FIG. 8 is a side elevation view of the suspension system drawn in FIG. 4 and showing, in ghost outline, the dynamic change in position of a casing for the damper assembly forming part of the suspension system.

The nature of the polyurethane material is such that a displacement indicated by arrow 114 may be in the opposite direction from that drawn in FIG. 8 and the hydraulic damper 74 will operate equally well to absorb the resulting impact. Thus the suspension system in accordance with the invention is adapted to provide damping in response to upwardly directed forces indicated by arrow 117 and downwardly directed forces indicated by arrow 119, (FIG. 3).

Polyurethane, being substantially incompressible, has a relatively constant volume and therefore behaves differently under torsional load than rubber. When the bolt 80 is tightened to close the lugs 78 on outer casing 76, the polyurethane hydraulic damper 74 becomes confined between the bearings 84 and 86 and is then placed under an initial hydrostatic pressure completely filling the cavity inside the casing 76 which determines the adherence between the polyurethane material and the associated components, the shaft 60 and the outer casing 76. With a torsional load applied to the casing 76, the adherence of the polyurethane to the adjacent surfaces of the shaft and the casing increases, particularly where the components have a toothed or irregular surface, as illustrated. As a result, the shock resistance of the polyurethane actually increases with increasing loads being applied thus avoiding the risks of delamination that are inherent in all vulcanized or banded prior art systems. Conveniently, the polyurethane hydraulic damper is discrete and can be removed and replaced or reshaped, as required. While the polyurethane will not delaminate from the surrounding structure, if the forces applied exceed its tensile strength, damage may manifest itself in the form of a tear or separation of the polyurethane material. Such damage does temporarily weaken the hydraulic damper 74, but the damper continues to perform adequately because the material adjoining the tear coalesces to form a bond and effectively repairs itself if the hydrostatic load is maintained.

The maximum torque which may be applied to the hydraulic damper 74 occurs in the configuration illustrated in FIG. 8 where the effective length of the segmented arm 56 is at a maximum and the turnbuckle link 58 is disposed at a right angle to the segmented arm 56. Such a configuration would be adopted where maximum damping is required, for example, for a lightweight rider or for riding over a particularly hard surface.

It will also be understood that the same configuration of the segmented arm 56 and relative position to the turnbuckle link 58 can be maintained while changing the angular disposition of the outer casing 76 relative to the shaft 60. This is illustrated in part, by the ghost outline position of the lugs 78 drawn in FIG. 4.

It will be appreciated that a maximum mechanical advantage is achieved in the solid outline (5 o'clock) position drawn in FIG. 8, and that the suspension will become harder or less reactive as an increasing load is applied to move the outer casing 76 from the solid line position drawn in FIG. 8 to the ghost outline position drawn (6 o'clock).

Conversely, if the initial position of the outer casing 76 and segmented arm 56 is in a 4 o'clock position, the continued application of force will progressively be resisted much less and the suspension will feel softer and more forgiving.

Returning now to FIG. 4, it will be seen that the effective length of the arm 56 may be adjusted by changing the relative angle between the first and second arm portions 92, 94. The range of positions of the second arm portion 94 is limited at one end by a lockout position indicated by chain line 97 and at the other end indicated by chain line 99 or by abutting on the bicycle frame 20. It will be understood that the maximum effective length for the arm 56 is in the ghost position drawn in FIG. 4 (6 o'clock) and that the effective length of the arm 56 is reduced in other radial positions of the second arm portion 94.

The relative arm positions would therefore be adjusted in accordance with the anticipated terrain and the body weight of the rider. For example, a lightweight rider would be inclined to require a softer suspension and would therefore increase the effective length of the arm 56 by approaching the 6 o'clock position where both arm positions are aligned to subtend an angle of 180°. However, if the terrain over which the rider is expecting to use the cycle is uneven, a certain minimum stiffness may be appreciated and therefore the rider may choose to set up the suspension system for a medium responsiveness corresponding to a relative angle between the first and second arm portions of about 4 o'clock.

Figure 4:
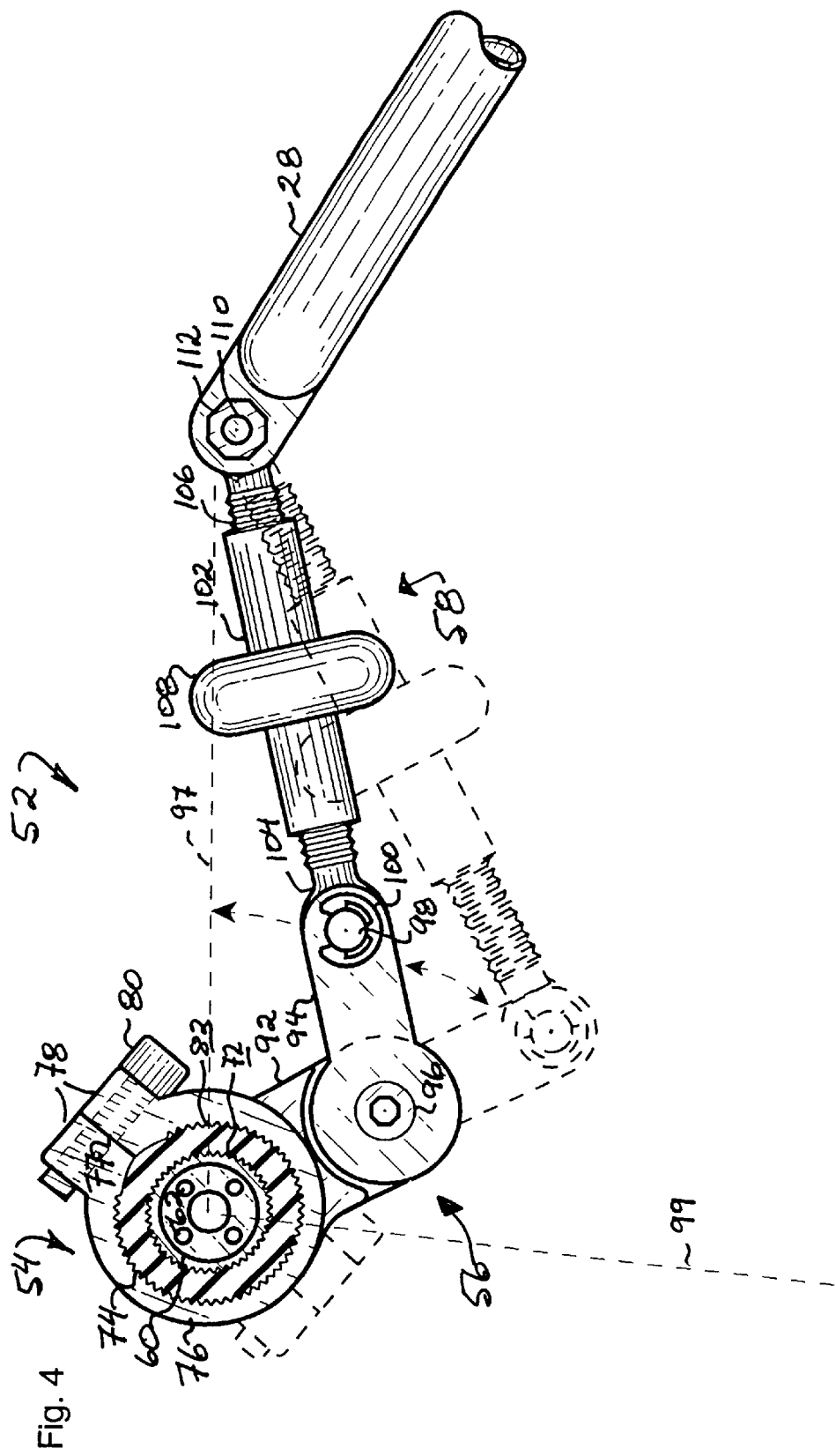
FIG. 4 (drawn to a larger scale) is a partly-sectioned view showing the components of the suspension system drawn in FIG. 3, with an alternative configuration drawn in ghost outline.

From FIG. 4, it will clearly be seen that the two configurations illustrated show an increase in the separation between the second arm portion 94 and the seat stays 28 when the arm portion 94 is moved into the ghost line position. If the rider requires the frame of the cycle to be static, it becomes necessary to adjust the length of the turnbuckle link 58. If the length of the turnbuckle 58 is not adjusted, the relative positions of the front portion 12 and rear portion 14 of the bicycle frame 10 will change and this change in geometry will have a commensurate change in the ground clearance indicated by arrow 116 of FIG. 3 and consequently, also shift the centre of gravity for the cycle.

In FIG. 3, a bicycle including the suspension system 52 of FIG. 4 and having a short length turnbuckle link 58, is drawn in solid outline while the same cycle with a longer turnbuckle length is drawn in ghost outline. This shows that merely manipulating the turnbuckle 58 to change its length can have a profound effect on the geometry of the cycle. As cycling enthusiasts will appreciate, such versatility in adjustment allows the cyclist to approach various terrains with confidence and with less fear of compromising rider safety because the center of gravity of the cycle can be raised or lowered, as required.

It will be noted that the turnbuckle link 58 may be extended by a distance sufficient for the turnbuckle link to reach the seat tube 26. In the style of cycle drawn in FIG. 3, the seat tube 26 extends downwardly from the seat to the chain sprocket 34 and the seat stays 28 extend forwardly of the seat tube 26 where they are joined by the bolt 110. Continued rotation of the grip 108 to extend the turnbuckle link 58 will result in the seat stays 28 bearing against the seat post, as drawn. This prestresses the rotary damper 54 by moving the arm 56 away from the seat tube 26 to assume a forward position illustrated by the ghost outline position drawn in FIG. 8.

Simple variations of the invention will now be described with reference to the remaining drawings. The suspension system indicated by numeral 50 in FIG. 2 comprises a damper assembly 54 and adjustable turnbuckle link 58 but has an arm 56 which is not segmented. In this embodiment of the invention, the effective length of the arm through which torque is applied to the hydraulic damper 74 remains constant and therefore the force required to obtain a desired damping effect cannot be adjusted as easily. However, as explained above with reference to FIG. 8, the radial position of the outer casing 76 relative to the shaft 60 can be adjusted and therefore the rate of damping desired may be selected so that it begins relatively hard and becomes softer (falling rate) or begins softer and becomes relatively harder (rising rate). In selecting the initial position of the outer casing 76 relative to the shaft 60, the user will have to consider that there will be an initial radial displacement or sag caused by the weight of the rider being transferred to the frame when the rider sits upon the cycle seat.

Figure 10:
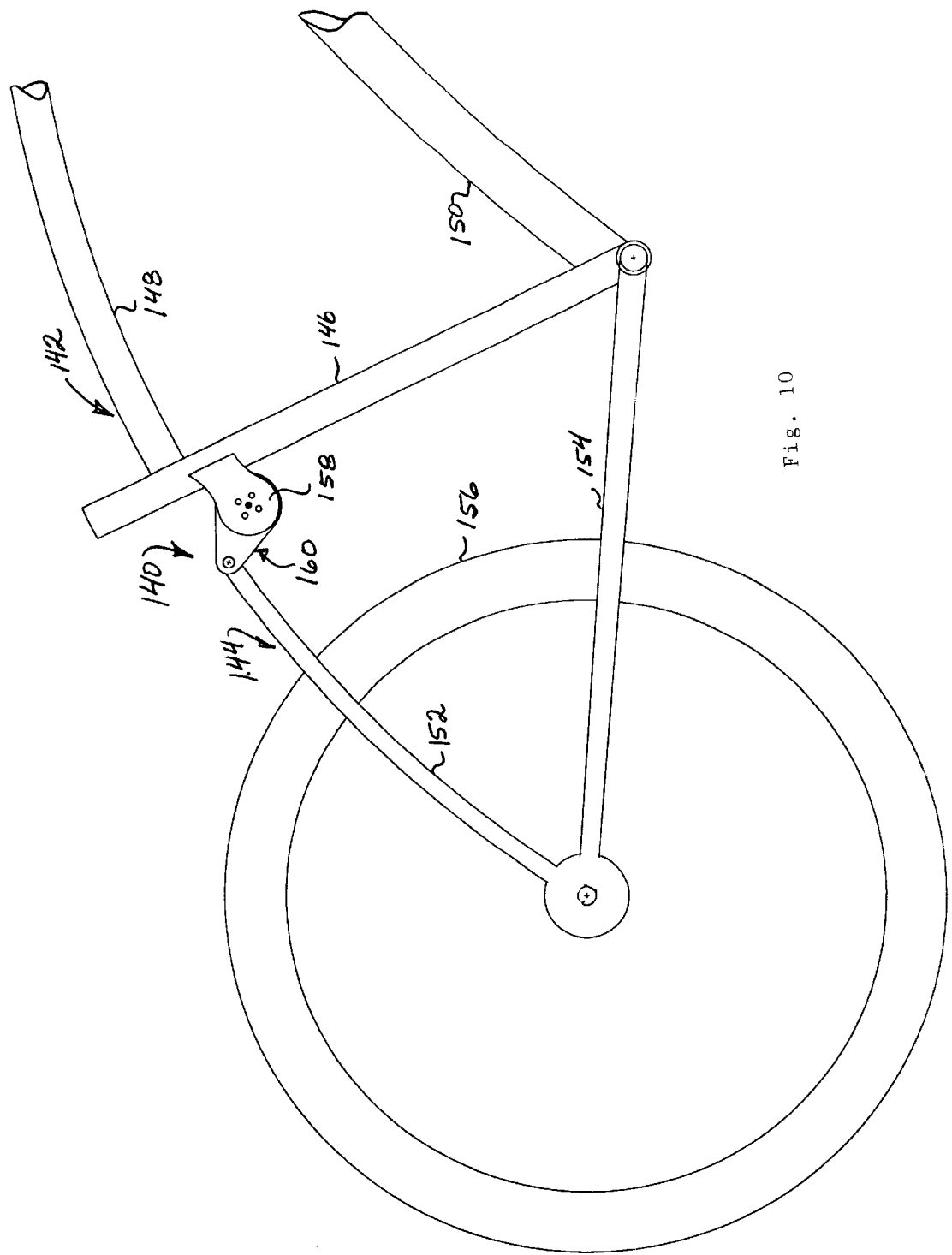
FIG. 10 is a schematic side elevation of a portion of a cycle incorporating a damper assembly forming part of a suspension system in accordance with the invention.

In another variation of the invention drawn in FIG. 10, a suspension system designated generally by reference numeral 140 is incorporated into a cycle frame having a forward portion 142 and a rear portion 144 relatively movable to each other. The forward portion 142 includes an upwardly-extending seat tube 146, a cross-bar 148, and a main frame portion 150 to which is attached a head tube (not shown) for supporting handle bars and a front wheel. The rear portion 144 of the cycle frame comprises a pair of upwardly extending seat stays 152 (only one of which is shown) and a pair of rearwardly extending chain stays 154 (only one of which is shown) pivotally connected to the bottom of the seat tube 146 at one end and joined to respective seat stays 152 at the other end.

The seat stays 152 and chain stays 154 may be discrete elements each rotatably coupled to a hub (not shown) for a rear wheel 156 or a unitary body, as drawn.

The suspension system 140 couples a forward end of the seat stays 152 to the forward portion 142 of the cycle frame and includes a mounting bracket 158 secured to the seat tube 146 for example, by welding, and a damper assembly 160. Because the bracket 158 extends rearwardly from the seat tube 146, no separate links are required to connect the damper assembly 160 to the rear portion 144 of the cycle frame although the seat stays 152 could themselves be considered links to the rear portion 144 of the cycle frame.

In accordance with the invention, the damper assembly 160, shown in detail in FIG. 11, comprises an outer casing 162 having an integrally formed arm 164 which extends outwardly from the casing 162 on one side thereof. The arm 164 is transverse to an axis of rotation defined by a shaft 166 rotatably coupled to the outer casing 162 and fixed to the bracket 158 with fasteners 163. A free end of the arm 164 is bifurcated (see FIG. 12) to receive a tongue extending from the seat stays 152 and oppositely disposed apertures 170, 172 are formed in the bifurcated ends of arm 164 to receive a pivot pin 168 which is coupled to the seat stays 152. The pivot pin 168 has an annular groove at one end which receive a Circlip™ 174 and a head 176 at the other end whereby the pivot pin 168 is secured to the arm 164.

A hydraulic damper 178 comprising a sleeve of polyurethane material having a Shore hardness ranging from 80 A to 90 A and chemically adjusted to suit the intended application is received between the outer casing 162 and the shaft 166.

Unlike the damper assembly of FIG. 4, the outer casing 162 is not split and it cannot be adjusted to clamp the polyurethane. In order to confine the polyurethane damper 178 and apply the necessary force to the polyurethane for the desired hydrostatic pressure, the components are carefully dimensioned and assembled with a press. The damper 178 is oversized to exceed the radial separation between the shaft 166 and an inner cavity formed in the outer casing 162 and is first placed into the outer casing 162. The shaft 166 is then driven inside a longitudinally extending opening formed in the polyurethane sleeve which causes the polyurethane material to come into intimate contact with the outer casing 162 and the shaft 166 and to bulge out under the pressure applied so as to protrude from a little beyond the toothed surfaces on the inside of the outer casing 162 and the toothed surfaces on shaft 166. Since penetration of the shaft 166 into the damper 178 is difficult, a lubricant of 5–10% volume dishwashing soap to water may be applied.

The polyurethane damper 178 is then confined inside the outer casing 162 by means of a pair of transverse bearings 180 in the form of an annular disc dimensioned to bridge the radial separation between the shaft 166 and the inner cavity of the outer casing 162. A central aperture 182 formed in the bearings 180 receives the shaft 166 and the bearings 180 are disposed on opposite ends of the shaft. The bearings 180 may be made of Delrin™, as previously described, or be made from a harder polyurethane material such as Addiprene™ LF 750 D having a Shore hardness of 75 D, for example. Optionally, a second pair of annular bearings 184 disposed on the first pair of bearings 180 between said bearings 180 and the mounting bracket 158 are provided to minimize friction between the damper assembly 160 and the mounting bracket 158.

The fasteners 163 are received through apertures 186 formed in the mounting bracket 158 and are threaded at one end to secure to threaded holes 188 formed in the shaft 166. In this way, pressure is applied both to increase the hydrostatic pressure and to confine the polyurethane damper 178 inside the outer casing 162 so as to prevent axial displacement and flow of the polyurethane material.

As noted above, the arm 164 of casing 162 is fixed directly to the seat stays 152. The arm 164 is not a segmented arm and therefore does not have first and second arm portions for adjusting the effective length of the arm. Where such an adjustment is desirable, the casing 162 can be modified as shown in FIG. 14.

Figure 14:
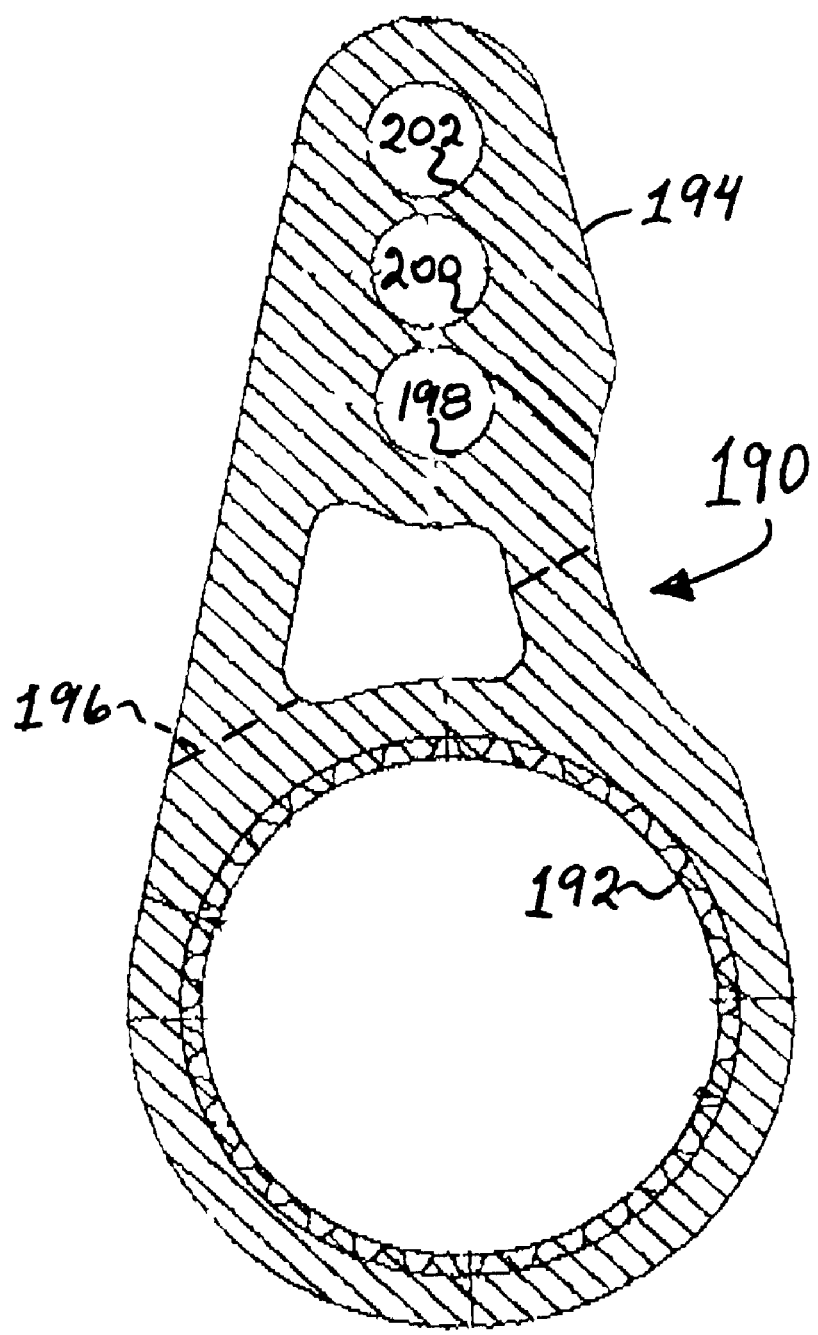
FIG. 14 is a cross-sectional elevation view showing an alternative embodiment of a casing forming part of the damper assembly.

A casing 190 is shown in FIG. 14 which may form part of a damper assembly incorporated into a cycle in the manner described elsewhere in this document. The casing 190 is a unitary body formed with a large toothed opening 192 at one end which is adapted to receive and confine a cylinder of polyurethane material which, as previously described with referenced to FIGS. 10 to 13, is brought into intimate contact with the casing 190. The casing has an integrally formed arm 194 which extends outwardly from the casing on one side thereof and is bifurcated along chain dotted line 196 to receive a tongue extending from bicycle seat stays at the rear of the cycle.

In the embodiment of FIGS. 10 to 13, the arm 164 has a single pair of oppositely disposed apertures 170, 172 for receiving a pivot pin to couple to the seat stays. The arm 194 of casing 190 has a set of three such apertures pairs 198, 200, 202 disposed along the length of the arm 194 to define an inner hole pair, an intermediate hole pair, and an outer hole pair respectively.

The effective arm length of the arm 194 for torquing the polyurethane damping element contained by the casing 190 can therefore be adjusted by selectively coupling the arm 194 to the rear portion of the cycle at one of the aperture pairs, inner hole pair 198 defining a shorter effective arm length than intermediate hole pair 200 and outer hole pair 202. It will be noted that minor modifications to the cycle frame may be required to accommodate the casing 190 in its various orientations as will be appreciated by those skilled in the art. The casing 190 with apertured arm 194 therefore provides adjustability of the effective arm length in three discrete locations whereas the casing 76 of FIG. 4 with segmented arm 56 is infinitely adjustable to provide an infinite range of effective arm lengths defined by the relative positions of first and second arm portions 92, 94.

In the embodiment of the suspension system 118 drawn in FIG. 6, like parts are identified by similar numerals as in FIG. 5. The only change appears in the damper assembly 54 which includes a second pair of bearings 120, 122 disposed between the respective sides 66, 68 of the bracket 70 and the bearings 84, 86 disposed adjacent to the outer casing 76. The second pair of bearings 120, 122 preferably made from a different material than bearings 84, 86, isolates the outer casing 76 from the bracket 70 so that there will be no friction hindering movement of the outer casing 76 about the internal shaft 60. In addition, a plurality of bearing disc pairs (84, 86) and (120, 122) provides flexibility to allow the components of the suspension system to be fitted to brackets where the separation between the sides 66, 68 may change in accordance with the width of the associated cycle frame.

As discussed with reference to FIG. 4, the relative angle between the first and second arm portions 92, 94 can be adjusted to change the force required to apply a predetermined torque to the hydraulic damper 74. In so doing, if the separation between the end of the second arm portion 94 remote from the rotary damper 54 and the seat stays 28 is fixed, the relative position of the front portion 12 and rear portion 14 of the bicycle frame 10 will change.

In an alternative embodiment of the invention, drawn in FIG. 7, with like components identified by like numerals, a link 130 of fixed length couples the second arm portion 94 to the seat stay 28. Where it is not desirable to change the geometry of the cycle frame resulting from different angular positions selected for the portions 92, 94, the damper assembly 54 is mounted to a bracket 132 which is slidably mounted on to cross-bar 24 as indicated by directional arrow 134. The bracket 132 comprises an upper portion 134 and a lower portion 136 adapted to receive the cross-bar 24 therebetween and having cooperating flanges secured by suitable fasteners 138 for securing the bracket 132 at selected locations on the cross-bar 24. Thus, rotation of the first arm portion 92 on fastener 96, as indicated by arrow 136, will cause the unsecured bracket 132 to slide on the cross-bar 24 and the relative position of the link 130 to the seat stays 28 can be maintained when the bracket is secured in place.

It will be understood that several variations may be made to the above-described embodiments of the invention without departure from the inventive concept defined in the appended claims. The invention provides a simple structure for suspending relatively movable parts which is easily adjustable and which does not unduly add any weight to the associated structure. The components require no lubrication and are relatively maintenance-free. While the embodiments have been described with reference to a bicycle, it will be understood that there has been no dimensional limitations placed on the components and that a polyurethane torsion spring having a 20 mm thickness suitable for a bicycle, could easily be scaled to a thickness of 12–15 cm so that it can safely be used with a heavier-weight cycle such as a motorcycle. Commensurate changes in the associated components would be required as will be apparent to those skilled in the art and will be understood to be within the scope of the appended claims.

What is claimed is:

1. Suspension system for a bicycle having first and second relatively movable frame portions, the suspension system including:

a damper assembly having a shaft defining an axis of rotation and adapted to be coupled to said first frame portion, a hydraulic damper comprising a sleeve of polyurethane material having a longitudinally extending opening receiving the shaft therethrough, an outer casing rotatably coupled to the shaft with said sleeve of polyurethane material disposed therebetween, the outer casing bearing on an outer surface of the sleeve of polyurethane so that the polyurethane material makes intimate contact with said shaft and said casing, and at least one pair of bearings transversely disposed to said axis of rotation and bearing on opposite ends of said sleeve of polyurethane material, the bearings being adapted to confine the polyurethane material and to prevent axial displacement and flow of the polyurethane material so that the polyurethane is placed under hydrostatic pressure; and an adjustable arm extending outwardly from said outer casing and transversely disposed to said axis of rotation, said arm having a free end and adjustment means for varying the effective length of the arm for torquing the hydraulic damper.

2. Suspension system according to claim 1 having a mounting bracket for supporting said shaft and adapted to be slidably mounted to the first frame portion.

3. Suspension system according to claim 1 in which the arm has a plurality of spaced apertures for coupling to said second frame portion at selected locations along a length of the arm defining an effective arm length for torquing said hydraulic damper.

4. Suspension system according to claim 1 having a link with a first end rotatably coupled to said free end of the arm, between the arm and said second frame portion.

5. Suspension system according to claim 4 in which the link has length adjustment means for changing the length of the link.

6. Suspension system for a bicycle having first and second relatively movable frame portions, the suspension system including:

a damper assembly having a shaft defining an axis of rotation and adapted to be coupled to said first frame portion, a hydraulic damper comprising a sleeve of polyurethane material having a longitudinally extending opening receiving the shaft therethrough, an outer casing rotatably coupled to the shaft with said sleeve of polyurethane material disposed therebetween, the outer casing bearing on an outer surface of the sleeve of polyurethane so that the polyurethane material makes intimate contact with said shaft and said casing, and at least one pair of bearings transversely disposed to said axis of rotation and bearing on opposite ends of said sleeve of polyurethane material, the bearings being adapted to confine the polyurethane material and to prevent axial displacement and flow of the polyurethane material so that the polyurethane is placed under hydrostatic pressure; and a segmented arm comprising a first arm portion extending outwardly from said outer casing and transversely disposed to said axis of rotation, and a second arm portion rotatably coupled to the first arm portion, said first and second arm portions being adapted to subtend a selected angle which defines an effective arm length for torquing said hydraulic damper.

7. Suspension system according to claim 6 including a link having a first end rotatably coupled to said second arm portion and having a second end adapted to be rotatably coupled to said second frame portion.

8. Suspension system according to claim 6 in which the link has length adjustment means for changing the length of the link.

9. Suspension system according to claim 6 having a mounting bracket for supporting said shaft and adapted for coupling said shaft to said first frame portion.

10. Suspension system according to claim 9 in which the mounting bracket is adapted to be slidably mounted to the first frame portion.

11. Suspension system according to claim 6 in which one of said first and second arm portions has a plurality of spaced apertures for coupling to said second frame portion at selected locations along a length of said one of said first and second arm portions to define an effective arm length for torquing said hydraulic damper.

12. A bicycle having first and second relatively movable frame portions and a suspension system, the suspension system comprising:

a damper assembly having a shaft defining an axis of rotation and coupled to said first frame portion, a hydraulic damper comprising a sleeve of polyurethane material having a longitudinally extending opening receiving the shaft therethrough, an outer casing rotatably coupled to the shaft with said sleeve of polyurethane material disposed therebetween, the outer casing bearing on an outer surface of the sleeve of polyurethane so that the polyurethane material makes intimate contact with said shaft and said casing, and at least one pair of bearings transversely disposed to said axis of rotation and bearing on opposite ends of said sleeve of polyurethane material, the bearings being adapted to confine the polyurethane material and to prevent axial displacement and flow of the polyurethane material so that the polyurethane is placed under hydrostatic pressure; and an adjustable arm extending outwardly from said outer casing and transversely disposed to said axis of rotation, said arm having a free end and adjustment means for varying the effective length of the arm for torquing the hydraulic damper.

13. Bicycle according to claim 12 having a mounting bracket supporting said shaft and slidably mounted to the first frame portion.

14. Bicycle according to claim 12, in which the arm has a plurality of spaced apertures for coupling to said second frame portion at selected locations along a length of the arm defining an effective arm length for torquing said hydraulic damper.

15. Bicycle according to claim 12 having a link with a first end rotatably coupled to said free end of the arm, between the arm and said second frame portion.

16. Bicycle according to claim 12 in which the link has length adjustment means for changing the length of the link.

17. A bicycle having first and second relatively movable frame portions and a suspension system, the suspension system comprising:

a damper assembly having a shaft defining an axis of rotation and coupled to said first frame portion, a hydraulic damper comprising a sleeve of polyurethane material having a longitudinally extending opening receiving the shaft therethrough, an outer casing rotatably coupled to the shaft with said sleeve of polyurethane material disposed therebetween, the outer casing bearing on an outer surface of the sleeve of polyurethane so that the polyurethane material makes intimate contact with said shaft and said casing, and at least one pair of bearings transversely disposed to said axis of rotation and bearing on opposite ends of said sleeve of polyurethane material, the bearings being adapted to confine the polyurethane material and to prevent axial displacement and flow of the polyurethane material so that the polyurethane is placed under hydrostatic pressure; and a segmented arm comprising a first arm portion extending outwardly from said outer casing and transversely disposed to said axis of rotation, and a second arm portion rotatably coupled to the first arm portion, said first and second arm portions being adapted to subtend a selected angle which defines an effective arm length for torquing said hydraulic damper.

18. Bicycle according to claim 17 including a link having a first end rotatably coupled to said second arm portion and having a second end rotatably coupled to said second frame portion.

19. Bicycle according to claim 17 in which the link has length adjustment means for changing the length of the link.

20. Bicycle according to claim 17 having a mounting bracket for supporting said shaft and coupling said shaft to said first frame portion.

21. Bicycle according to claim 17 in which the mounting bracket is slidably mounted to the first frame portion.

22. Bicycle according to claim 17, in which one of said first and second arm portions has a plurality of spaced apertures for coupling to said second frame portion at selected locations along a length of said one of said first and second arm portions to define an effective arm length for torquing said hydraulic damper.

* * * * *